United States Patent [19]

Dantlgraber

[11] Patent Number: 4,864,210

[45] Date of Patent: Sep. 5, 1989

[54] SERVO VALVE

[75] Inventor: Jörg Dantlgraber, Lohr-Sackenbach, Fed. Rep. of Germany

[73] Assignee: Mannesmann Rexroth GmbH, Fed. Rep. of Germany

[21] Appl. No.: 153,785

[22] Filed: Feb. 8, 1988

[30] Foreign Application Priority Data

Feb. 16, 1987 [DE] Fed. Rep. of Germany ....... 3704845

[51] Int. Cl.[4] .............................................. G05B 11/32

[52] U.S. Cl. ..................................... 318/625; 251/14; 251/129.11; 137/487.5

[58] Field of Search ............. 318/625; 251/14, 129.11; 137/487.5

[56] References Cited

U.S. PATENT DOCUMENTS 3,940,677 2/1976 Morino et al. .................. 318/625 X
4,133,511 1/1979 Hartmann et al. ........... 137/487.5 X

*Primary Examiner*—William M. Shoop, Jr.
*Assistant Examiner*—Saul M. Bergmann
*Attorney, Agent, or Firm*—Cushman,Darby & Cushman

[57] ABSTRACT

An electro-hydraulic servo-valve having a valve spool and comprising: an adjustment motor, and a control apparatus for adjusting said adjustment motor to depending on the input nominal value, wherein said adjustment motor transmits its movement directly to the valve spool of the hydraulic valve, and wherein a preferably electrically operating additional drive is provided which will be switched on in case the valve spool gets stuck so as to release the valve spool from its stuck condition.

10 Claims, 1 Drawing Sheet

SERVO VALVE

TECHNICAL FIELD

This invention relates generally to an electro-hydraulic servo-valve, and more particularly to a direct controlled electro-hydraulic servo-valve, i. e. a servo-valve in which the valve spool, for instance of a directional spool valve is actuated substantially directly by means of an electric control motor. The invention also relates to the control motor as such.

BACKGROUND ART

Electro-hydraulic servo-valves are known in a large variety. Such servo-valves comprise most of the time two stages and sometimes 3 stages. Generally, the first or pilot stage comprises a torque motor which cooperates with a jet flapper plate amplifier. The pilot stage provides for an amplification of the pilot oil flow which is proportional to an input signal. The pilot oil flow will then cause a movement of the spool in a second or main stage. The main stage, in turn, will provide for additional amplification of the pilot oil flow and supplies a working oil flow which is proportional to the pilot oil flow and, consequently, also proportional to the input signal. The actual value of this working oil flow is generally indirectly determined by means of a mechanical characteristic, like for example the movement of the spool. This actual value is then supplied in the form of an electrical signal to a control apparatus. The just described known electro-hydraulic servo-valve requires a pilot stage with the result that a good sensitivity is obtained. As a consequence, however, there is always a high flow of hydraulic pilot oil, which causes losses.

Also known are servo-valves using an electro-motor which directly actuates the spool of a valve, in particular, the spool of a directional control valve. For example, the shaft of said electro-motor is provided with a crank- or excenter means for direct actuation of the spool. If in such a servo-valve the valve spool gets stuck (stuck condition), the electro-motor has to be designed such that the force supplied by the electro-motor is sufficient to remove the spool out of such a stuck position (or stuck condition). Frequently, the stuck condition occurs because a chip of material is trapped between the control edges of the valve. So as to release the spool from the stuck condition the chip has to be severed, so that the valve spool can resume its movement. The force which is required for this purpose and which has to be generated by the electro-motor can be called the "chip shear force", because it will shear or sever the chip. So as to make sure that such a motor can supply the required chip shear force it has to be very large. This is generally disadvantageous and, moreover, the motor will become sluggish because of its size.

With regard to specific prior art, attention is drawn to German patents 22 32 566 and 32 47 953, as well as German laid-open applications 31 37 419 and 32 46 298.

It has to be emphasized that the high required shear force requires a large motor which due to its large mass will allow only for low acceleration. However, high acceleration is desirable, so as to provide for a fast response.

It is an object of the present invention to overcome the disadvantages of the prior art.

It is a another object of the invention to provide an electro-hydraulic servo-valve such that an optimal dynamic response as well as the best possible frequency characteristic is obtained.

According to another object of the present invention, the servo-valve should have a small size, a low weight, and a reliable function.

In accordance with a further object of the invention, the servo-valve as well as the control motor allow for a direct actuation of the valve spool.

DISCLOSURE OF THE INVENTION

In one aspect of the present invention an electro-hydraulic servo-valve having an electro motor (main electro motor) is provided together with a an additional drive means. Preferably the drive means is a motor (additional motor). In accordance with a preferred embodiment of the invention the additional motor is an additional electric motor.

The main electro motor is designed such that it will provide for the best possible frequency characteristic, but is not designed such that it can supply the required chip shear force. The additional drive means, preferably an electric motor, is provided and designed to generate the additional force required to shear the chip. Alternatively, the additional motor is a rotary magnet.

The electric additional drive means which can supply the required chip shear force is, in accordance with the invention, switched on only if a stuck condition exists, i.e. if the chip shear force is actually required. Circuit means are provided to determine when the chip shear force is required, so as to actuate thereupon the additional drive means.

Preferably the main motor as well as the additional motor are of small design. Preferably, both motors are DC-motors having a rod-like armature.

In accordance with a preferred embodiment of the invention the main motor and the additional motor are coaxially arranged. It is preferred that an angle pick-up means (angle measuring system) is connected to the motor shaft of the main motor, so as to determine with high precision the position of the motor shaft and, consequently, the position of the valve spool. During normal operation the additional motor is not coupled to the main motor and also not to the motor shaft of the main motor. A torsion spring fixedly maintains the (shaft of the) additional motor in its center position. The main motor, i. e. the shaft of the main motor, and the additional motor, i. e. the shaft of the additional motor, have abutment means offset by 180°. Thus, when the additional motor is switched on, because the valve spool got stuck, a maximum path of movement is available, so as to transmit an impulse force as high as possible onto the main motor shaft.

It should be mentioned in this context that for a conventional servo-valve with only one motor, said motor can be easily subject to an overload condition: in case the spool gets stuck the control apparatus will try to further adjust or control the motor which will then tend to be overloaded.

With regard to a preferred embodiment of the invention attention is also drawn to the attached claims.

BEST MODE FOR CARRYING OUT THE INVENTION

Figures 1, 2:
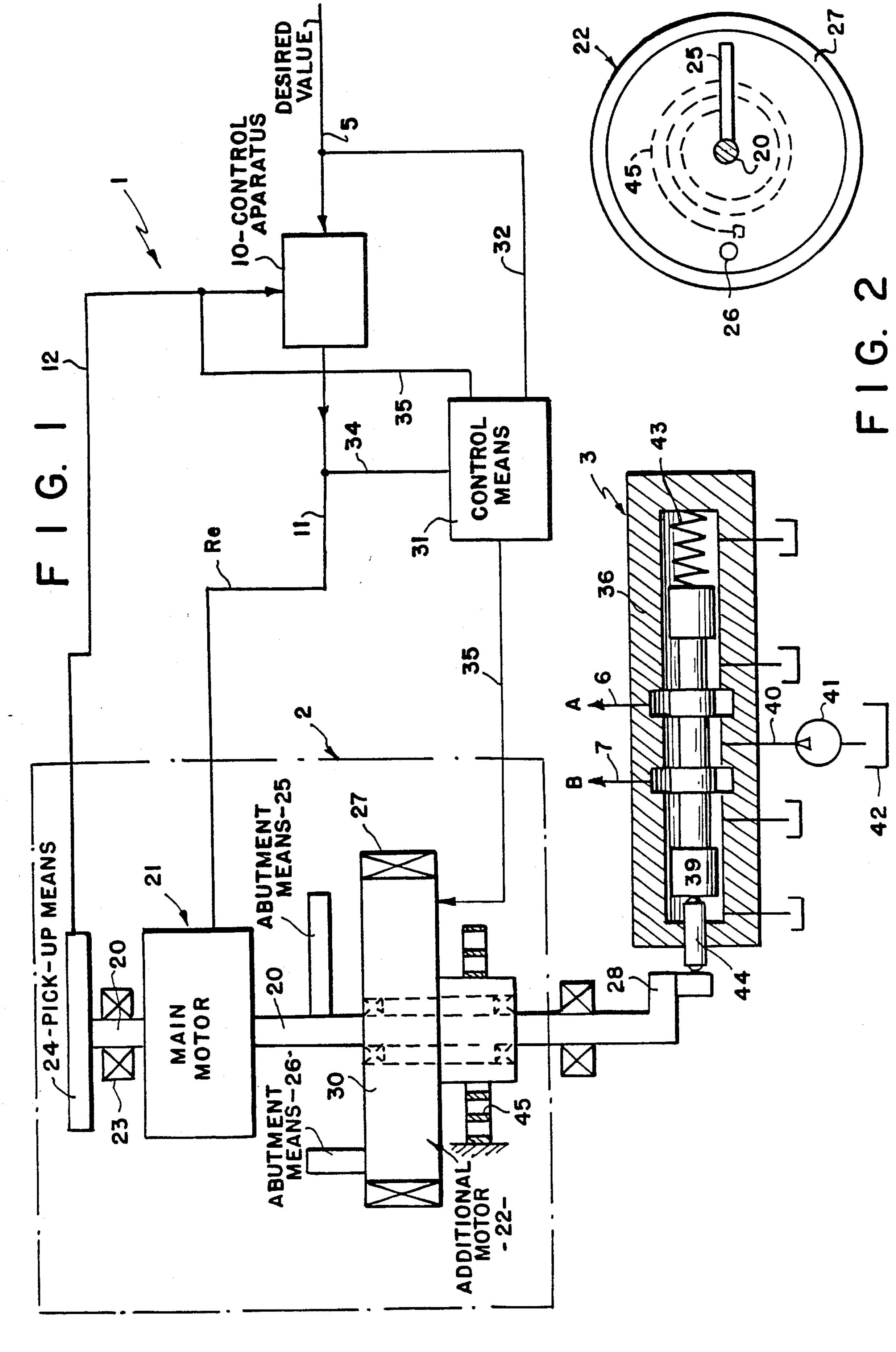
FIG. 1 shows an embodiment of an electro-hydraulic servo-valve of the invention.
FIG. 2 is a plan view cut below the main motor.

Referring to the Figure, an electro-hydraulic servo-valve 1 embodying the principles of the present invention is shown and comprises a control motor 2 for the direct control or actuation of a valve 3, in particular a directional spool valve. The direct actuation of the valve 3 is carried out by means of a motor shaft 2. The motor shaft 2 carries at its one end a crank means or an excenter 28 which directly actuates the valve spool 39 of the valve 3. As is shown, between the excenter 28 and the valve spool 39 an intermediate element 44 is provided in the form of a pin. Inasmuch as no play occurs between excenter 28, pin 44 and spool 39, such an arrangement can be said to provide a "direct" actuation. However, it is also possible to have the excenter 28 act "completely" directly, i.e. without the intermediate pin 44 onto the spool 39.

The electro-hydraulic servo-valve 1 is supplied via an electrical conduit 5 with the nominal or desired value I-Soll as an input representing a desired angle of rotation of shaft 20. The output of servo valve 1 is an angle of rotation of said shaft 20, and the distance moved by the spool 39 due to the rotation of said shaft 20 is proportional to said angle of rotation.

Specifically, the nominal value I-Soll is inputted into a control apparatus 10. The control apparatus 10 compares said nominal value I-Soll with the actual value I-Ist which is supplied by an electric conduit 12. (As is well known in the art, I-Ist and I-Soll are typically present in the form of electrical current or voltage signals.) The control apparatus 10 then generates an electric control signal Re. The control signal Re is supplied to the control motor 2 via an electrical conduit 11, so as to adjust said control motor 2 in accordance with the value Re.

The control motor 2 comprises a main motor 21 for driving or rotating the shaft 20. The control motor 2 causes a rotation of the shaft 20 in accordance with the control signal Re. The shaft 20 is rotatably supported in bearings 23 and carries at its one end an angle pick-up means 24 which supplies the already mentioned actual value I-Ist via conduit 12. The angle pick-up 24 determines the position shaft 20 and consequently also the position of the valve spool 39 with high precision because of the reduction in transmission (amplification) provided by the excenter.

The main motor 21 is designed such that it needs to supply only a force which is sufficient for carrying out the adjustment of the valve spool 39 during normal operation. The main motor 21 is not designed to generate a force of such a level that the spool of the valve can be set free if it got stuck. As already mentioned, for instance a chip of material can be trapped between the control edges of the valve and thus lead to a blocking or "stuck" condition of the spool 39. It is required that this chip be severed by a sufficiently high force, so that the operation can be continued. The high force required for this purpose is called the chip shear force. In accordance with the present invention said chip shear force is not and does not need to be supplied by the main motor. Therefore, the main motor 21 can be designed according to the requirements for the best possible frequency characteristic, so that the main motor altogether is an optimized and, consequently, small motor 21.

For the generation of said chip shear force a second (small) motor, an additional motor 22 is provided which is generally not coupled to the main motor 21. This additional motor 22 is preferably coaxially arranged with respect to the motor shaft 20 of the main motor 21, and can in a situation where the chip shear force is required, transmit said chip shear force onto the main motor 21, i. e. the shaft 20 thereof. The main motor 21, i. e. its motor shaft 20 and the additional motor 22 each have abutment means 25 and 26, respectively, which are offset with respect to each other by 180°. During normal operation the additional motor 22 is not energized. The additional motor 22 is designed and arranged such that the abutment means of the additional motor 22 will impact against the abutment means 25 of the main motor 21 and its shaft 20, respectively, after having moved about an angle of more than 120°(depending on the location at which the valve spool 35 and the main motor got stuck). When energized, the additional motor 22 will rotate unimpededly for almost half a rotation (180°), gather momentum, and then impact against the abutment means 25 (practically like a hammer). Due to this "impulse transmission" relatively large forces can be built up, so that the valve spool 39 will be set free. During the normal operation of the servo-valve 1 the additional motor 22 remains in a spring centered (middle) position due to the action of torsion spring 45 (which acts in a manner similar to the balance spring of a watch).

In accordance with the invention a control means 31 for the additional motor 22 is provided, so as to control the action of the additional motor 22. The additional motor control 31 determines the existence of a "stuck condition" based on electrical signals supplied over the electrical conduits 32, 33, 34, i. e. based on the nominal value I-Soll, the actual value I-Ist and the control value Re. In case that such a condition of stuck is determined, the additional motor 22 is energized via electric conduit 35. The additional motor 22 will then start to move and the abutment means 26 of the additional motor 22 will impact onto the abutment means 25 of the shaft 20 as was already mentioned. Thus, the additional motor control 31 determines a deviation between the nominal value I-Soll and the actual value I-Ist and sends a command to the additional motor 22 to start rotating in its one or the other required direction.

The control 31 is designed such that the additional motor 22 generates additional force impulses in case that the first impulse has not yet removed the condition of stuck.

The main motor 21 as well as the additional motor 22 are preferably designed in the form of an electric motor having a rod-like armature design. Such motors have a small moment of inertia and they can accelerate very quickly.

The use of two small motors instead of one large motor provides for a substantially better dynamic response and also for a smaller, compact size compared with the use of a single motor. Moreover, the weight of the two motors is smaller than the weight of a single motor. With the design of the invention it is, for all practical purposes, impossible to overload the winding of the main motor 21.

It should be noted that instead of an additional motor it is generally possible to use other additional drive means, preferably an electrical additional drive means. Such an additional electrical drive means could be provided in the form of a rotary magnet. A rotary magnet as well as an additional electric motor have the additional advantage that they will not to be subjected to any deleterious influences if the main motor is subject to accelerations from different directions.

I claim:

1. An electro-hydraulic servo-valve comprising:

a valve having an adjustable valve spool, a control motor adapted to adjust said spool, a control apparatus for supplying an adjustment signal on said control motor, said adjustment signal depending on a comparison between an input nominal value and an input actual value, said control motor being coupled to said valve spool to transmit its movement directly onto said adjustable valve spool, and wherein said control motor comprises an electric main motor, and an additional electric drive means for providing, if energized, an additional force required to supplement the force generated by the main motor in a condition where the valve spool is struck (stuck condition), so as to provide release of the valve spool from its stuck condition, said additional electric drive means being switched off (deenergized) during non-stuck conditions.

2. The valve of claim 1 wherein the additional drive means is an electro motor.

3. The valve of claim 1 wherein the main motor is designed such that it will provide for the best possible frequency characteristic but will not be able to supply the required high force (shear force) necessary to remove the stuck condition, e.g. cut a trapped chip of material which causes the stuck condition, and wherein said additional electric motor is designed such that it does supply the required shear force, but is switched on only if the action of said chip shear force is required.

4. The valve of claim 3 wherein a control means (31) for the additional motor is provided for determining the occurrence of a stuck condition, and for energizing said additional motor if such a condition of stuck is determined.

5. The valve of claim 3 wherein the main motor and the additional motor are coaxially arranged with respect to each other.

6. The valve of claim 3 wherein the additional motor is not coupled to a shaft of the main motor and is maintained in a middle position by means of a torsion spring.

7. The valve of claim 6 wherein the additional motor comprises abutment means by means of which a force impulse is transmitted to the shaft of the main motor.

8. The valve of claim 7 wherein the additional motor supplies, if necessary a plurality of pulses.

9. A control motor for a servo valve comprising a main motor for causing the movement of the spool of the servo valve via a motor shaft, and an additional motor which is energized only if the spool of the servo valve encounters a stuck condition to then generate a force sufficient for overcoming said stuck condition, said force being transmitted to said valve spool.

10. The valve of claim 1 wherein the additional drive means is a rotary magnet.

* * * * *